(12) United States Patent
Manne et al.

(10) Patent No.: US 9,372,803 B2
(45) Date of Patent: Jun. 21, 2016

(54) METHOD AND SYSTEM FOR SHUTTING DOWN ACTIVE CORE BASED CACHES

(71) Applicant: Advanced Micro Devices, Inc., Sunnyvale, CA (US)

(72) Inventors: Srilatha Manne, Portland, OR (US); Michael Schulte, Austin, TX (US); Lloyd Bircher, Austin, TX (US); Madhu Saravana Sibi Govindan, Austin, TX (US); Yasuko Eckert, Kirkland, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 565 days.

(21) Appl. No.: 13/722,808

(22) Filed: Dec. 20, 2012

(65) Prior Publication Data

US 2014/0181413 A1 Jun. 26, 2014

(51) Int. Cl.
*G06F 12/08* (2006.01)

(52) U.S. Cl.
CPC ........ *G06F 12/0891* (2013.01); *G06F 12/0806* (2013.01); *Y02B 60/1225* (2013.01)

(58) Field of Classification Search
CPC .................................. G06F 12/08; G06F 1/32
USPC .................................................. 711/135, 111
See application file for complete search history.

(56) References Cited

U.S. PATENT DOCUMENTS

| 6,052,789 | A * | 4/2000 | Lin ....................... G06F 1/3203 365/229 |
| 6,370,614 | B1 * | 4/2002 | Teoman et al. ................ 711/113 |
| 7,356,647 | B1 * | 4/2008 | Andrighetti et al. .......... 711/118 |
| 2004/0215885 | A1 * | 10/2004 | Cargnoni et al. .............. 711/135 |
| 2005/0080994 | A1 * | 4/2005 | Cohen .................... G06F 1/3225 711/118 |
| 2009/0150695 | A1 * | 6/2009 | Song ..................... G06F 1/3203 713/323 |
| 2010/0194341 | A1 * | 8/2010 | Anupindi et al. ............. 320/118 |
| 2010/0274772 | A1 * | 10/2010 | Samuels ....................... 707/693 |
| 2012/0239860 | A1 * | 9/2012 | Atkisson et al. .............. 711/103 |
| 2013/0185511 | A1 * | 7/2013 | Sassone et al. ............... 711/119 |

* cited by examiner

*Primary Examiner* — Adam M Queler
*Assistant Examiner* — Kenneth Tsang
(74) *Attorney, Agent, or Firm* — Volpe and Koenig, P.C.

(57) ABSTRACT

A system and method are presented. Some embodiments include a processing unit, at least one memory coupled to the processing unit, and at least one cache coupled to the processing unit and divided into a series of blocks, wherein at least one of the series of cache blocks includes data identified as being in a modified state. The modified state data is flushed by writing the data to the at least one memory based on a write back policy and the aggressiveness of the policy is based on at least one factor including the number of idle cores, the proximity of the last cache flush, the activity of the thread associated with the data, and which cores are idle and if the idle core is associated with the data.

20 Claims, 6 Drawing Sheets

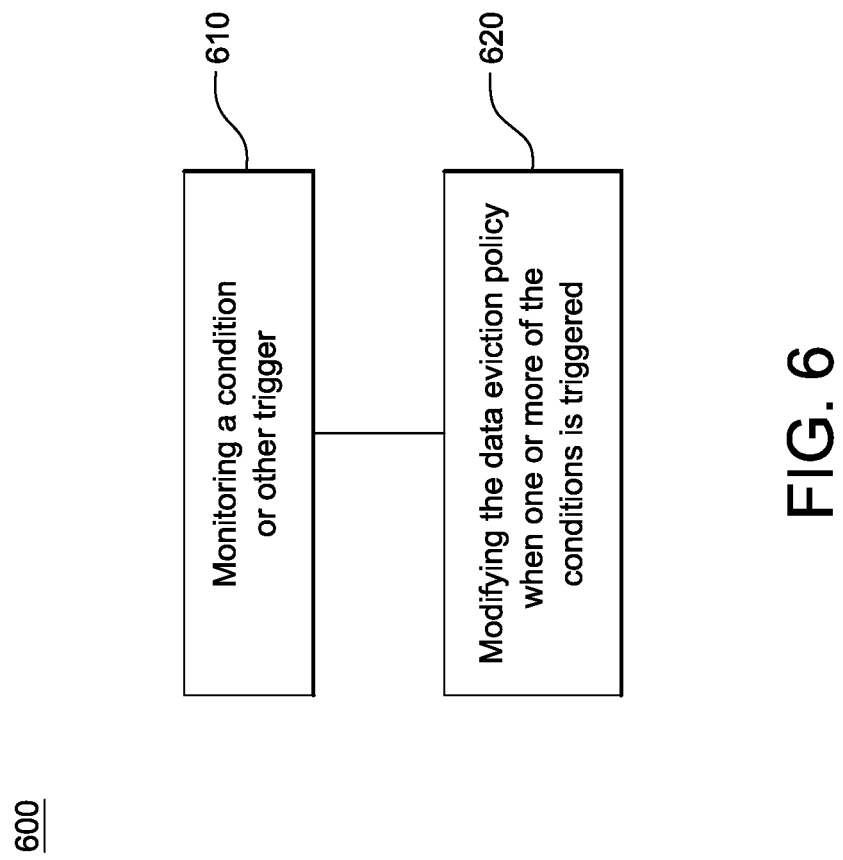

METHOD AND SYSTEM FOR SHUTTING DOWN ACTIVE CORE BASED CACHES

TECHNICAL FIELD

The disclosed embodiments are generally directed to shutdown policies for caches, and in particular, to a method and system for shutting down active core based caches.

BACKGROUND

Caches dissipate significant amounts of power, including leakage power. This power may be reduced by power gating the cache when all cores sharing the cache are in an idle (cc6) state. For the cache to be powered down, all of the modified states in the cache (dirty data) must be flushed. Flushing state requires significant time and power, particularly if there is a lot of state to be flushed.

Present solutions contemplate proactively flushing the cache. However, present solutions do not differentiate based on modified or non-modified data. This may be achieved by examining the location in the least recently used (LRU) chain to determine stale data. Any modified block in the LRU chain is proactively written back. This solution diminishes the number of stale writes residing in the cache, but does not address the non-stale writes. Further, this solution does not address the issue of whether data should be written back at all or retained in the cache regardless of where it resides in the LRU chain.

Other solutions may keep a bit per subset of cache lines indicating whether there is any dirty data in the blocks. In this way, a set of lines may be eliminated if none of the lines retain any dirty data without having to walk through each cache line. This may eliminate spurious checks for dirty data that are not required, but fails to address the problem of eliminating dirty data from the cache.

There is a need to therefore address the problem of minimizing the amount of dirty data in the shared cache when there is a higher likelihood that the shared cache will be shut down.

SUMMARY OF EMBODIMENTS

A system and method are disclosed. Some embodiments include a processing unit, at least one memory coupled to the processing unit, and at least one cache coupled to the processing unit and divided into a series of blocks, wherein at least one of the series of cache blocks includes data identified as being in a modified state. The modified state data is flushed by writing the data to the at least one memory based on a write back policy, and the aggressiveness of the policy is based on at least one factor including the number of idle cores, the proximity of the last cache flush, the activity of the thread associated with the data, and which cores are idle and if the idle core is associated with the data.

BRIEF DESCRIPTION OF THE DRAWINGS

A more detailed understanding may be had from the following description, given by way of example in conjunction with the accompanying drawings wherein:

FIG. 6 illustrates a method of shutting down active based cores, in accordance with some embodiments.

DETAILED DESCRIPTION

A method and system for shutting down active core based caches are disclosed. Some embodiments include the ability to save power in CPU systems, by flushing idle cores and caches of the architectural state and by setting these flushed cores and caches to a power gated state. Some embodiments address the latency of flushing modified states (dirty data) by proactively flushing modified states from a shared cache based on which core(s) are already in a halt state and how many cores remain active.

Some embodiments include a processing unit, at least one memory coupled to the processing unit, and at least one cache coupled to the processing unit and divided into a series of blocks, wherein at least one of the series of cache blocks includes data identified as being in a modified state. The modified state data is flushed by writing the data to the at least one memory based on a write back policy and the aggressiveness of the policy is based on at least one factor including the number of idle cores, the proximity of the last cache flush, the activity of the thread associated with the data, and which cores are idle and if the idle core is associated with the data.

Figure 1:
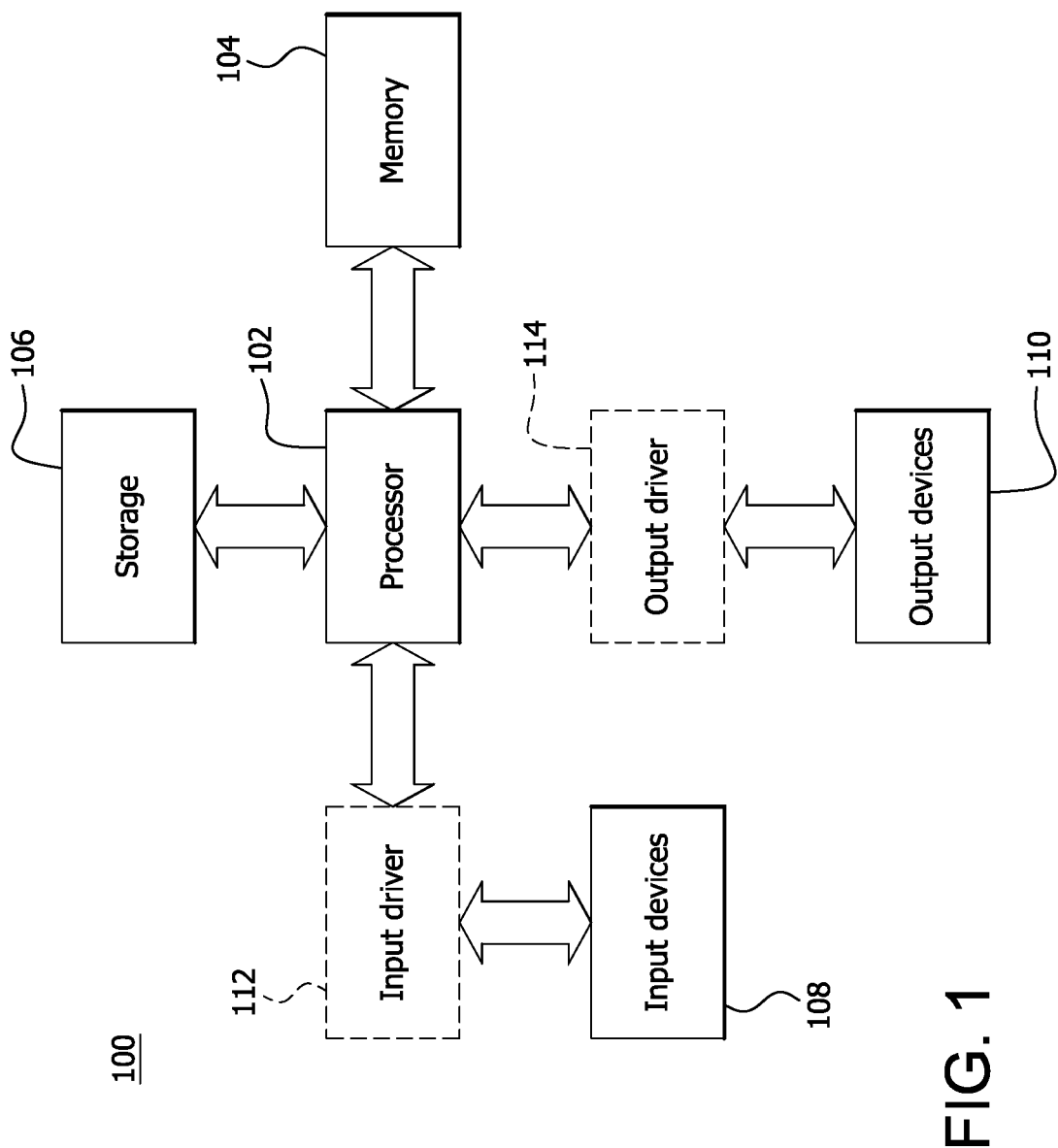
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
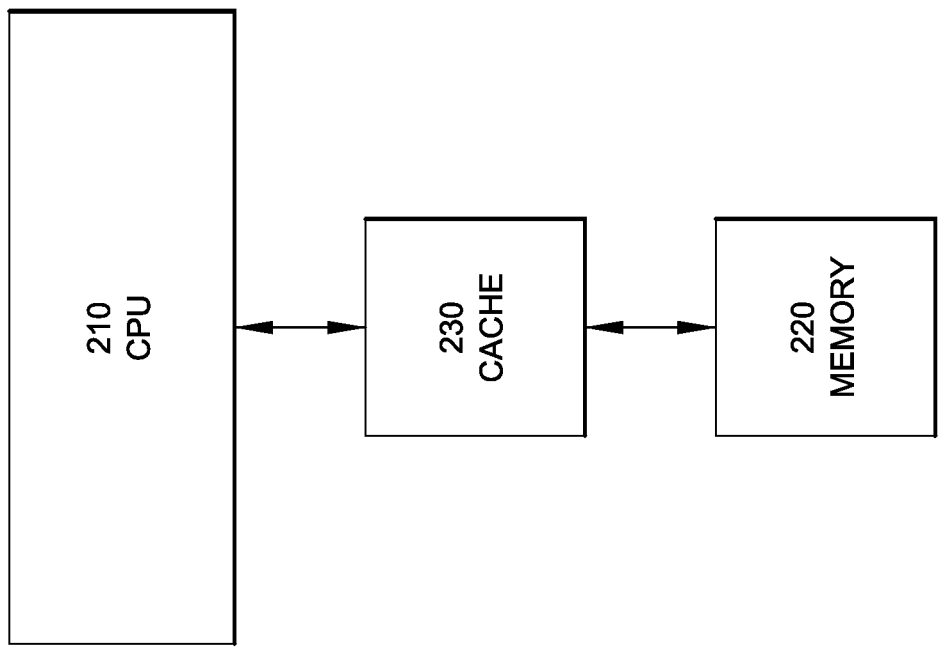
FIG. 2 illustrates a computer system including the interface of the central processing unit, main memory, and cache, in accordance with some embodiments.

FIG. 2 shows a computer system 200 including the interface of the central processing unit (CPU) 210, main memory 220, and cache 230, in accordance with some embodiments. CPU 210 may be the portion of computer system 200 that carries out the instructions of a computer program, and may be the primary element carrying out the functions of the computer. CPU 210 may carry out each instruction of the program in sequence, to perform the basic arithmetical, logical, and input/output operations of the system.

Suitable processors for CPU 210 include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

Typically, CPU 210 receives instructions and data from a read-only memory (ROM), a random access memory (RAM), and/or a storage device. Storage devices suitable for embodying computer program instructions and data include all forms of non-volatile memory, including by way of example, semiconductor memory devices, magnetic media such as internal hard disks and removable disks, magneto-optical media, and optical media such as CD-ROM disks and DVDs. Examples of computer-readable storage mediums also may include a register and cache memory. In addition, the functions within the illustrative embodiments may alternatively be embodied in part or in whole using hardware components such as ASICs, FPGAs, or other hardware, or in some combination of hardware components and software components.

Main memory 220, also referred to as primary storage, internal memory, and memory, may be the memory directly accessible by CPU 210. CPU 210 may continuously read instructions stored in memory 220 and may execute these instructions as required. Any data may be stored in memory 220 generally in a uniform manner. Main memory 220 may comprise a variety of devices that store the instructions and data required for operation of computer system 200. Main memory 220 may be the central resource of CPU 210 and may dynamically allocate users, programs, and processes. Main memory 220 may store data and programs that are to be executed by CPU 210 and may be directly accessible to CPU 210. These programs and data may be transferred to CPU 210 for execution, and therefore the execution time and efficiency of the computer system 200 is dependent upon both the transfer time and speed of access of the programs and data in main memory 220.

In order to increase the transfer time and speed of access beyond that achievable using memory 220 alone, computer system 200 may use a cache 230. Cache 230 may provide programs and data to CPU 210 without the need to access memory 220. Cache 230 may take advantage of the fact that programs and data are generally referenced in localized patterns. Because of these localized patterns, cache 230 may be used as a type of memory that may hold the active blocks of code or data. Cache 230 may be viewed for simplicity as a buffer memory for main memory 220. Cache 230 may or may not interface directly with main memory 220, although cache 230 may use information stored in main memory 220. Indirect interactions between cache 230 and main memory 220 may be under the direction of CPU 210.

While cache 230 is available for storage, cache 230 may be more limited than memory 220, most notably by being a smaller size. As such, cache algorithms may be needed to determine which information and data is stored within cache 230. Cache algorithms may run on or under the guidance of CPU 210. When cache 230 is full, a decision may be made as to which items to discard to make room for new ones. This decision is governed by one or more cache algorithms.

Cache algorithms may be followed to manage information stored on cache 230. For example, when cache 230 is full, the algorithm may choose which items to discard to make room for the new ones. In the past, as set forth above, cache algorithms often operated on the block level so that decisions to discard information occurred on a block by block basis and the underlying algorithms developed in order to effectively manipulate blocks in this way. As cache sizes have increased and the speed for access is greater than ever before, cache decisions may be examined by combining blocks into regions and acting on the region level instead.

Figure 3:
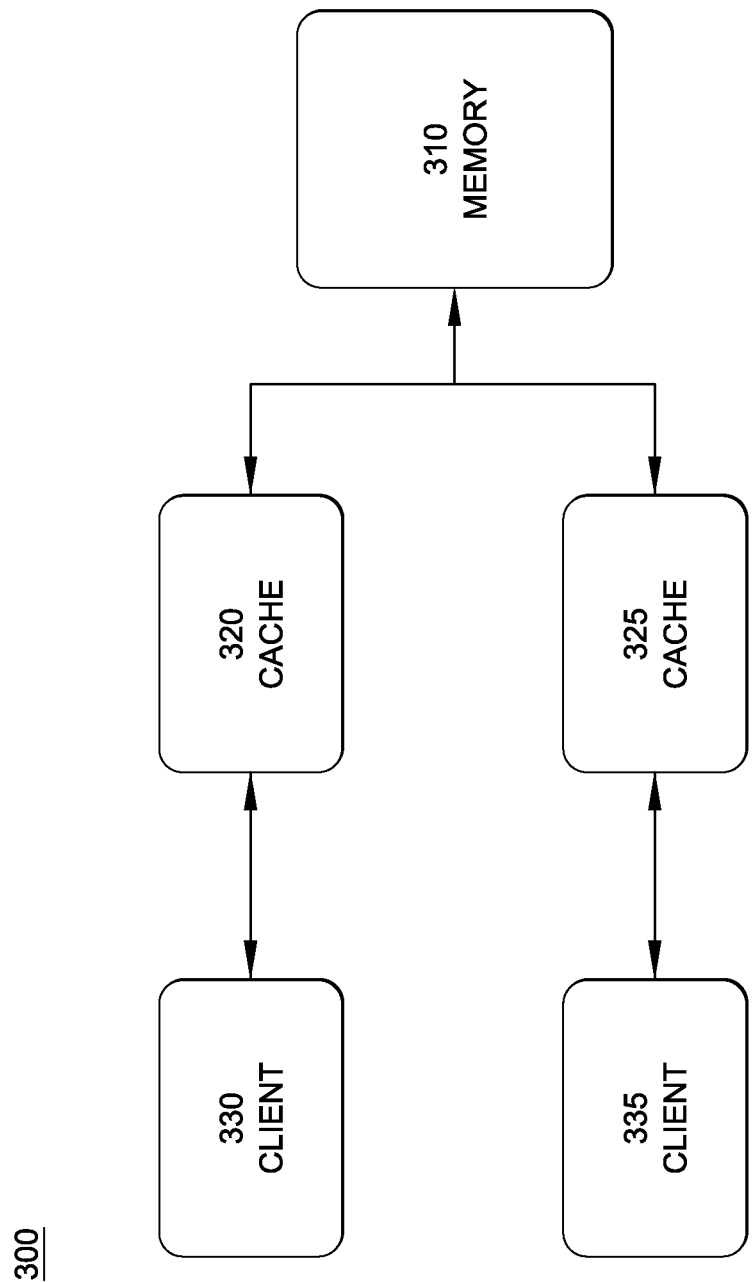
FIG. 3 illustrates a multiple cache structure sharing resources, in accordance with some embodiments.

In computing, cache coherence refers to the consistency of data stored in local caches of a shared resource. When clients in a system maintain caches of a common memory resource, problems may arise with inconsistent data. This is particularly true of CPUs in a multiprocessing system. Referring to FIG. 3, there is illustrated a multiple cache structure 300 sharing resources, in accordance with some embodiments. Multiple cache structure 300 may include a memory resource 310, a first cache 320, a second cache 325, a first client 330, and a second client 335. Caches 320, 325 may each be coupled to memory resource 310 having therein a plurality of memory blocks. Client 330 may be coupled to cache 320, and client 335 may be coupled to cache 325. In this example, if client 330 has a copy of a memory block from a previous read of memory resource 310 and client 335 changes that memory block, client 330 may be left with an invalid cache of memory without any notification of the change. Cache coherence is intended to manage this type of conflict and maintain consistency between cache and memory.

Transitions between states in any specific implementation of these protocols may vary. For example, an implementation may choose different update and invalidation transitions such as update-on-read, update-on-write, invalidate-on-read, or invalidate-on-write. The choice of transition may affect the amount of inter-cache traffic, which in turn may affect the amount of cache bandwidth available for actual work. These affects may be considered in the design of distributed software and may cause strong contention between the caches of multiple processors.

Various models and protocols have been devised for maintaining cache coherence, such as MSI, MESI (also referred to as the Illinois protocol), MOSI, MOESI, MERSI, MESIF, write-once, Synapse, Berkeley, Firefly and Dragon protocols. To provide an understanding of cache operations several of these protocols will be discussed. While other protocols may be utilized, some protocols are discussed below to provide a framework for discussion. Any protocol including those above may be used regardless of whether further discussion is included herein.

Figure 4:
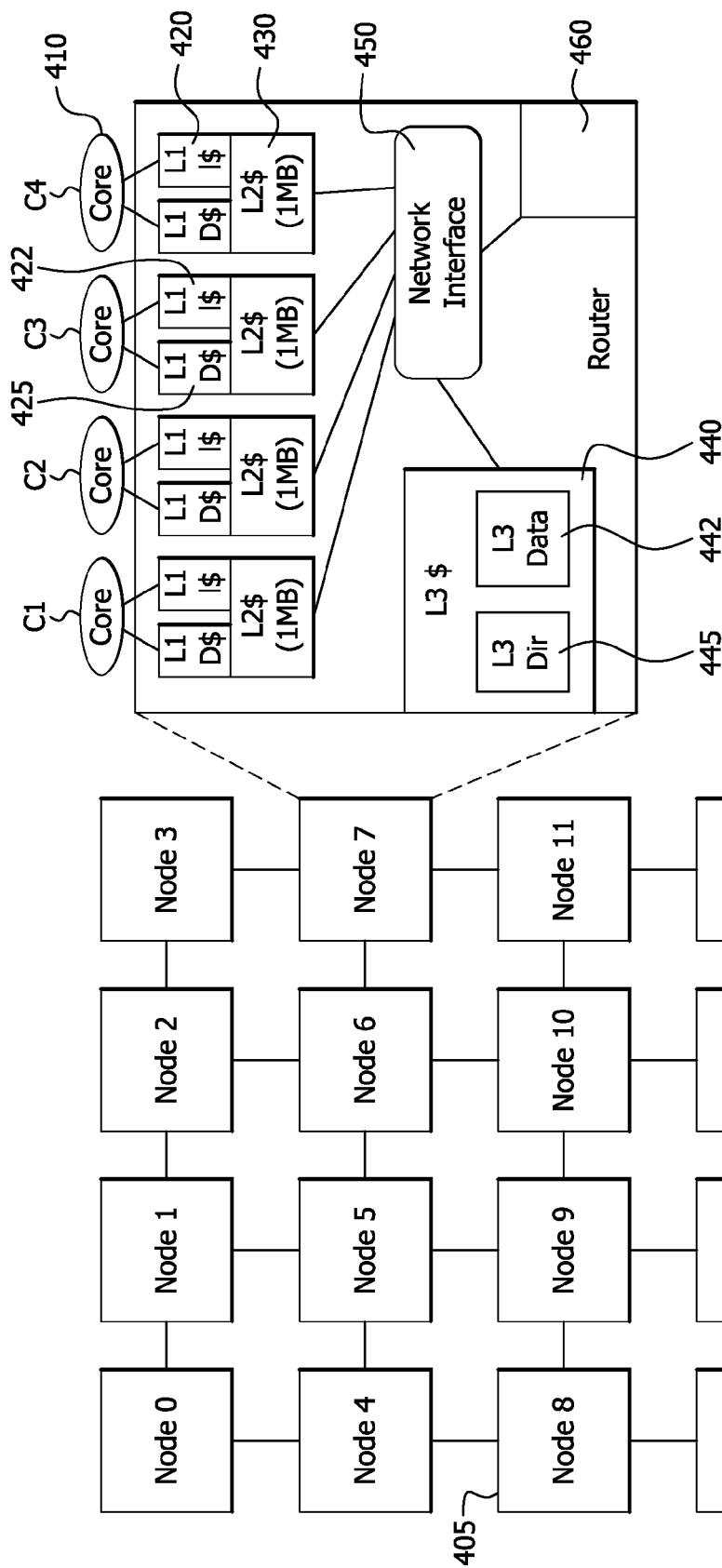
FIG. 4 illustrates a baseline architectural design of a core processor using directory protocols, in accordance with some embodiments.

FIG. 4 is baseline architectural design of a core processor using directory protocols, in accordance with some embodiments. Shown in FIG. 4 are sixteen nodes (identified as Node 0, Node 1, . . . , Node 15) 405. Node 7 is shown in an exploded view in FIG. 4. Each node may have a plurality of cores 410, although four are shown in FIG. 4 as C1, C2, C3 and C4 as an example, there may be more or less cores 410. The core 410 may have associated therewith a level 1 (L1) or primary cache 420, often the fastest type of cache, and may be located on the processor. L1 cache 420 may be split into two caches of equal size—one may be used to store program data, shown as L1 D$ 425, and another may be used to store microprocessor instructions, shown as L1 I$ 422. A unified L1 cache 420 may be used to store both data and instructions in the same cache (not shown).

Core 410 may also have a level 2 (L2) secondary cache 430. Generally, L2 cache 430 is larger than L1 420 and located between the processor and memory. A level 3 (L3) cache 440 may also be present and may be located between the processor and memory. Generally, L3 440 is slower and larger than L2 430. As shown in FIG. 4, L3 cache 440 may be sectioned into discrete parts including directory 445 and data 442, for example. As shown in FIG. 4, while L1 420 and L2 430 caches may be unique to core 410, such as C1, for example, L3 cache 440 may be shared by some or all of the plurality of cores 410 within a node. In FIG. 4, L3 cache 440 may be shared by cores C1, C2, C3, C4. As shown, FIG. 4 has 16 nodes, 64 cores, 128 L1 caches, 64 L2 caches, and 16 L3 caches. Maintaining coherence of these 208 caches requires a proper balance of storage overhead and bandwidth demand.

Power may be conserved in CPU systems, by flushing idle cores and caches of architectural state and by setting these flushed cores and caches to a power gated state. The latency of flushing modified states may be addressed by proactively flushing modified states from a shared cache based on which core(s) are already in a halt state and how many cores remain active.

Cache write back is the process of moving data blocks back to the memory via the system bus. Cache write back may also include writing lower cache blocks back to higher level cache blocks. A myriad of different techniques for writing back may be used, while a few are discussed herein for completeness and understanding.

A first technique is write back. In write back, memory locations that are identified as dirty are held in the cache until a read request evicts the line as a replacement. Generally, every time a cache read miss occurs a dirty cache line may be replaced by incoming data. As a result, a read miss in a write back cache requires two memory accesses—one to retrieve the needed data and one to write the replaced data from the cache to the storage.

Write through occurs when the system writes to a memory location that is currently held in the cache and writes to both the cache and the memory location. While the present description generally discusses that the next level after the cache is memory, the present discussion includes other configurations, such as in BullDozer servers, the L2 is flushed to enter C6, while the L3 stays active. Therefore, modified data is flushed to the L3, not to memory. This maintains the cache in sync with the memory. Write through, in general, means that the entry is written to the current level and the next level, whether the next level be memory or cache. A write-through for L1, for example, may send all modified data to L2. L1 caches may include separate partitions for instruction and data portions of the cache lines to aid in instruction fetch rates.

Figure 5:
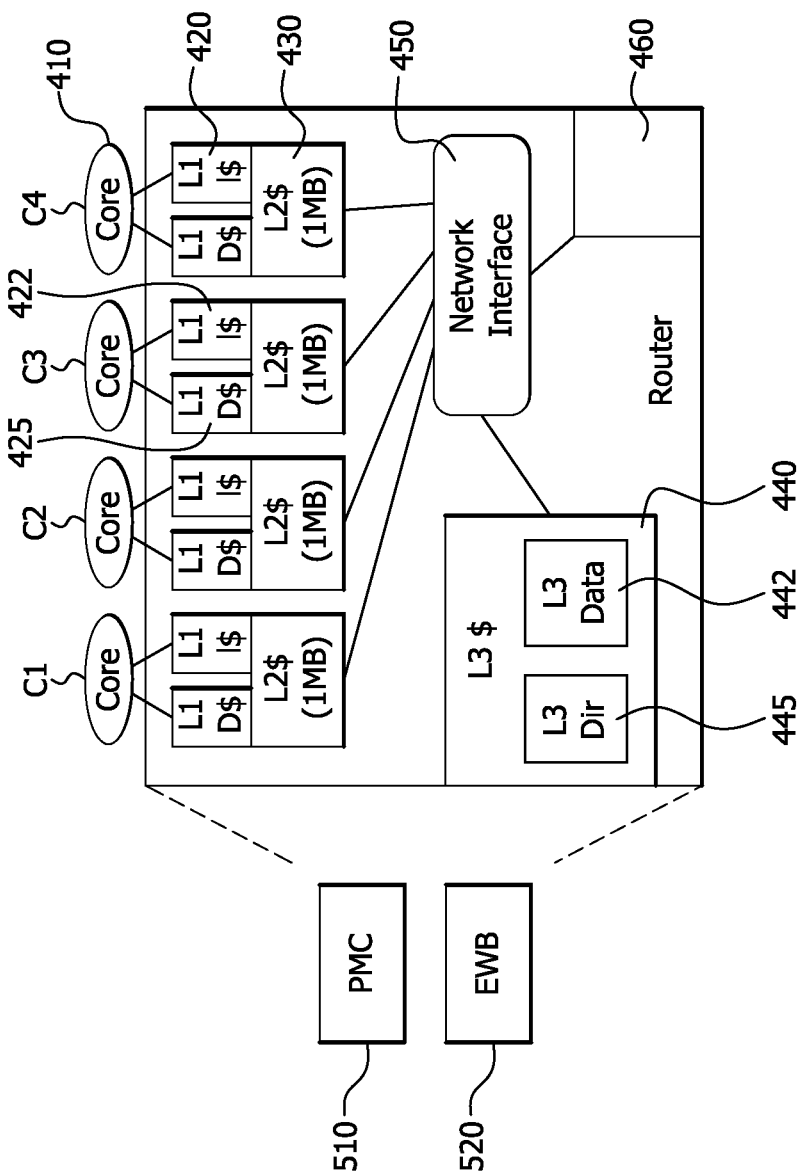
FIG. 5 illustrates a system where eager writeback policy is managed by an engine that walks through the cache and writes back dirty data, in accordance with some embodiments.

Eager write back occurs when dirty cache lines are written to the next level in the hierarchy and clear the dirty bits earlier than in a conventional write back. Generally, the eager write back is a compromise between the write back and write through techniques. In eager write back, dirty lines are evicted as and when the main system bus is free. For example, as shown in FIG. 5, eager write back policy is managed by an engine 520 that walks through the cache and writes back dirty lines, in accordance with some embodiments. This engine may reside in the cache and does not require active participation from the CPU. For example, flushing the cache may require that microcode be run through the CPU to initiate the flush. The present eager write-back widget 520 may reside in the cache and not require any micro-code or CPU interaction.

When and how aggressively to enable the eager write back may be controlled by a power management controller, such as the System Management Unit (SMU). Such a power management controller 510 may reside near the CPU. This power management controller 510 may include therewith, located proximate to, inside of, or separate from, a eager writeback widget 520. The writeback widget 520 may control the aggressiveness of the data eviction policy. When a page is modified in the buffer cache, that modified page may not be immediately written back to the disk. Instead, this page may be marked as dirty meaning that the page can have more than one logical write made before it is physically written to disk. A transaction log of the dirty data may be created. When the power management controller 510 decides on the basis of the eager write back widget 520, the dirty pages may be written to disk, thereby eliminating any dirty data. The system and method address the problem of minimizing the amount of dirty data in the shared cache when there is a higher likelihood that the shared cache will be shut down. Specifically, caching may occur continuously when the system is operating. Flushing the cache may include writing file date in the system file cache to the disk at intervals, thereby freeing the memory used by the file data.

The number of active cores may be used as a guide for the aggressiveness of the eager write back policy as well as varying the aggressiveness of the policy based on factors discussed below. In the employed eager write back policy, data is written back to the next level cache but the cache line is retained in the current cache in the S state.

There is a benefit to proactively evicting modified data from the cache, which is that it allows for faster shutdown of the cache. However, there is a power penalty if the cache never shuts down or shuts down too infrequently to compensate for the overhead of evicting modified data. In addition, there is a performance penalty if the cache block is written to multiple times, requiring multiple evictions of modified data for the same cache block. The present system and method guide the aggressiveness of the eviction mechanisms using information about which core is idle and how many cores are idle as is described more fully below.

Several definitions may provide for a clear understanding of the system and method.

$C_{shared}$: Number of cores sharing a cache $C_{active}$: Number of active cores.

$C_{idle}$: Number of idle cores.

By definition, the number of active cores is less than or equal to the number of cores sharing a cache—$C_{active} \leq C_{shared}$. Similarly, the number of cores sharing a cache equals the number of active cores plus the number of idle cores—$C_{shared} = C_{active} + C_{idle}$.

The system and method include several distinct approaches. While these approaches are presented in isolation herein, the present description contemplates using one or more of the approaches in combination with other approaches. That is, one, two, three, or four of the approaches may be used in any combination.

A first approach modifies the aggressiveness of the modified data eviction policy based on the number of idle cores ($C_{idle}$). This approach may be based on how many idle cores exist, either based on a percentage of the number of cores, or just based on a count of the idle cores. For example, in a configuration where there are four cores sharing a common L2 write-back cache, such as in the Jaguar family, assume $C_{minidle}=1$. If the number of idle cores is one or less, then the standard write-back policy may be used. If the number of idle cores is $>=2$, then the eager write back engine may activate to evict modified data out of the cache. To create different degrees of aggressiveness, if $C_{idle}=2$, then the modified data in half the ways (the least recently used ways) may be evicted. If $C_{idle}=3$, then the eager write-back widget begins to evict all modified data. In addition, the cache becomes write-through such that no new modified data is written exclusively to the cache. For example, if $C_{idle}<C_{minidle}$, then do not write back modified data from the cache unless that line is required for new data. If $C_{idle} \geq C_{minidle}$, then the process of writing back modified data from the cache may occur. This "how many" approach operates on the assumption that if a certain number of cores are already idle, then there is a higher probability that all cores will soon enter the idle state.

Another approach modifies the aggressiveness of the modified data eviction policy based on the how often in the past the cache has been flushed and the processor placed in a C6 state, and when the cache was last flushed. For example, if the processor has a track record of entering C6 often, then an aggressive eager write back may be employed. The metrics used for determining frequent C6 entry is a function of the number of times (T) that the processor has entered C6 state in the last N time units and/or C6 entry events. One way to implement this is to have a shift register(s) that track the number of times that C6 was safely entered in the last N opportunities to enter C6. The shift register tracks the last N events, where N can be 8, 16, or the like. For example, if all cores are idle, then C6 may be entered. However, if during the processor flushing, a wake up event occurs which results in C6 being existed before C6 was completely entered, a "0" is shifted into the register. If C6 is entered and is maintained for a reasonable amount of time, such as at least the energy breakeven point, a "1" may be entered into the register to indicate that C6 was successful. The energy breakeven point is the time that the core needs to be idle in order to compensate for the energy cost of entering C6 including flushing caches, and storing and restoring architectural state. This may be on the order of 650 usec. If $C_{idle}$ becomes less than $C_{minidle}$ before the system enters C6, then a '0' is shifted into the register that keeps track of the number of times C6 is entered. If the number of times we entered C6 is large enough relative to the number of times that $C_{idle}>=C_{minidle}$, then a more aggressive flush policy may be used.

A third approach may employ a function of which cores are idle to determine which modified data to write back out of the shared cache. Such an approach is based on which core is idle. If core C1 is idle, then all modified data belonging to the thread assigned to core C1 may be evicted from the shared cache regardless of how many cores are idle at the time. Once a minimum number of cores are idle ($C_{idle} \geq C_{minidle}$), all data in a modified state may be aggressively written back out of the cache regardless of which core last modified the data. This implementation would require a process ID to be assigned to each cache block. The core ID is not enough because a process may have switched from running on Core 0 to running on Core 1. If we only use the core ID to identify the data that is no longer required, then we'd end up evicting blocks that are now useful to Core 1 may be evicted.

Another approach is based on which thread the data belongs. The data written back may be a function of which thread tends to be pervasive rather than which core is idle. If a particular thread keeps switching cores but continues to be active, then the data related to that thread may be retained in the cache. However, other threads that have a short duration and then do not return within a period of time are considered to be transient and the data associated with such a thread is given higher priority for eager write back. Once again, tracking process IDs may aid this solution. If processes that are still alive in the system are tracked, regardless of which core they are running on, then a decision of which cache lines to evict from the cache may be made. Each cache block may have a process ID. In addition, the SMU (or system management unit) must track which processes are currently active in the cores. If a particular process has run in the past and has not been active for a period of time, then the modified lines associated with that process may be removed.

A method of shutting down active based cores is illustrated in FIG. 6, in accordance with some embodiments. The method 600 for shutting down active based cores may include monitoring a condition or other trigger, at step 610. The condition or trigger may include number of idle cores, frequency of cache flushing and/or when the cache was lasted flushed, which cores are idle, and which cores are impacted by a given thread of data as discussed herein above. When one or more of the conditions is triggered, the data eviction policy may be modified to be more aggressive, at step 620, in accordance with some embodiments. Variations in the aggressiveness may be used based on the type of conditions that were triggered and/or if the conditions were easily met. For example, if the condition that is triggered is the number of cores that are idle, and the condition is if the number is greater than one a more aggressive policy may be pursued, the level of aggressiveness may be further increased if the number of idle cores is three, for example.

In accordance with some embodiments, the aggressiveness of the policy is based on the proximity of the last cache flush or on the proximity of the last cache flush associated with at least one active based core. The proximity of the last cache flush includes the probability that a reduction in the number of active cores has resulted in a cache flush. That is, the proximity of the last flush includes a probability as to the basis for why the last the cache flush was done.

Other contemplated approaches include combining the above approaches. For example, the number of cores that are idle may be combined with which cores are idle to provide a modified approach to the write back.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the disclosed embodiments.

The methods or flow charts provided herein may be implemented in a computer program, software, or firmware incorporated in a computer-readable storage medium for execution by a general purpose computer or a processor. In some embodiments, the computer-readable storage is a non-transitory computer-readable storage medium. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A system comprising:
   a processing unit;
   at least one memory coupled to the processing unit; and
   at least one cache coupled to the processing unit and divided into a series of blocks, wherein at least one of the series of blocks includes data identified as being in a modified state;
   wherein:
   the modified state data is flushed by writing the data to the at least one memory based on a write back policy,
   the aggressiveness of the policy is based on at least one factor,
   a factor is a frequency that a core of the processing unit enters an idle state,
   a threshold associated with the factor is set to a predetermined number of cores meeting the factor,
   wherein the aggressiveness of the policy is proportional to a degree above which the threshold is met;
   and wherein the flushing allows the at least one core to be set to a power-gated state.

2. The system of claim 1 wherein the at least one factor is the number of idle cores.

3. The system of claim 1 wherein the at least one factor is the proximity of the last cache flush.

4. The system of claim 3 wherein the proximity of the last cache flush is associated with the probability that a reduction in the number of active cores has resulted in a cache flush.

5. The system of claim 1 wherein the at least one factor is the activity of the thread associated with the data.

6. The system of claim 1 wherein the at least one factor includes which cores are idle and if the idle core is associated with the data.

7. A method of shutting down at least one active based core, the method comprising:
   monitoring via a processor at least one condition of a plurality of conditions regarding the at least one active based core and modifying the aggressiveness of the data eviction policy for at least one cache associated with the at least one active based core based on the monitoring;
   the data eviction policy determining when modified state data is flushed by writing the data to at least one memory associated with the at least one active based core, and
   wherein:
   a condition is a frequency that the at least one active core enters an idle state,
   a threshold associated with the condition is set to a predetermined number of cores meeting the condition, and
   the aggressiveness of the policy is proportional to a degree above which the threshold is met.

8. The method of claim 7 wherein the at least one factor is the number of idle cores related to the at least one active based core.

9. The method of claim 7 wherein the at least one factor is the proximity of the last cache flush associated with the at least one active based core.

10. The method of claim 9 wherein the proximity of the last cache flush is associated with the probability that a reduction in the number of active cores has resulted in a cache flush.

11. The method of claim 7 wherein the at least one factor is the activity of the thread associated with the data.

12. The method of claim 7 wherein the at least one factor includes which cores related to the at least one active based core are idle and if the idle core is associated with the data.

13. The method of claim 7 wherein the flush allows the processor to operate with reduced power.

14. A non-transitory computer-readable medium having processor-executable instructions stored thereon which, when executed by at least one processor, will cause the at least one processor to perform a method of shutting down at least one active based core, the method comprising:
   monitoring via a processor at least one condition of a plurality of conditions regarding the at least one active based core and modifying the aggressiveness of the data eviction policy for at least one cache associated with the at least one active based core based on the monitoring;
   the data eviction policy determining when modified state data is flushed by writing the data to at least one memory associated with the at least one active based core, and
   wherein:
   a condition is a frequency that the at least one active core enters an idle state,
   a threshold associated with the condition is set to a predetermined number of cores meeting the condition, and
   the aggressiveness of the policy is proportional to a degree above which the threshold is met.

15. The non-transitory computer readable medium of claim 14 wherein the at least one factor is the number of idle cores related to the at least one active based core.

16. The non-transitory computer readable medium of claim 14 wherein the at least one factor is the proximity of the last cache flush associated with the at least one active based core.

17. The non-transitory computer readable medium of claim 16 wherein the proximity of the last cache flush is associated with the probability that a reduction in the number of active cores has resulted in a cache flush.

18. The non-transitory computer readable medium of claim 14 wherein the at least one factor is the activity of the thread associated with the data.

19. The non-transitory computer readable medium of claim 14 wherein the at least one factor includes which cores related to the at least one active based core are idle and if the idle core is associated with the data.

20. The non-transitory computer readable medium of claim 14 wherein the flush allows the processor to operate with reduced power.

* * * * *